(12) United States Patent
Fake et al.

(10) Patent No.: US 8,738,768 B2
(45) Date of Patent: May 27, 2014

(54) MULTIPLE DESTINATIONS FOR MAINFRAME EVENT MONITORING

(75) Inventors: Robert Fake, Clifton, VA (US); Deborah Gannaway, Tampa, FL (US)

(73) Assignee: Meas, LLC, Tampa, FL (US)

( * ) Notice: Subject to any disclaimer, the term of this patent is extended or adjusted under 35 U.S.C. 154(b) by 262 days.

(21) Appl. No.: 13/437,631

(22) Filed: Apr. 2, 2012

(65) Prior Publication Data

US 2012/0254313 A1    Oct. 4, 2012

Related U.S. Application Data

(60) Provisional application No. 61/470,333, filed on Mar. 31, 2011.

(51) Int. Cl.
  *G06F 15/173* (2006.01)
  *H04L 12/24* (2006.01)
  *H04L 12/26* (2006.01)
  *H04L 12/56* (2006.01)

(52) U.S. Cl.
  CPC .......... *H04L 41/06* (2013.01); *H04L 41/0686* (2013.01); *H04L 43/04* (2013.01); *H04L 43/06* (2013.01); *H04L 45/00* (2013.01)
  USPC ............ 709/224; 709/203; 709/238; 709/246

(58) Field of Classification Search
  USPC .......................................... 709/224, 238, 246
  See application file for complete search history.

(56) References Cited

U.S. PATENT DOCUMENTS

| | | | |
|---|---|---|---|
| 7,526,452 B2* | 4/2009 | Agarwal et al. .................. 705/52 |
| 7,642,504 B2* | 1/2010 | Abrate et al. ............ 250/227.14 |
| 8,108,550 B2* | 1/2012 | Lahoti et al. ................... 709/238 |
| 8,402,540 B2* | 3/2013 | Kapoor et al. ................... 726/23 |
| 8,458,519 B2* | 6/2013 | McCune et al. ................. 714/25 |
| 2008/0162592 A1* | 7/2008 | Huang et al. .................. 707/202 |
| 2010/0011031 A1* | 1/2010 | Huang et al. .................. 707/202 |
| 2013/0073573 A1* | 3/2013 | Huang et al. .................. 707/755 |

* cited by examiner

*Primary Examiner* — Michael Y Won

(74) *Attorney, Agent, or Firm* — Holland & Hart LLP

(57) ABSTRACT

Methods, systems, and devices are described for managing mainframe events. In the methods, systems, and devices of the present disclosure, at least one mainframe event is received at a mainframe event server module communicatively coupled with a mainframe. The received at least one mainframe event may be converted to an open format. A destination Security Information and Event Management (SIEM) application may be selected for the received at least one mainframe event based on a set of rules, and a format associated with the selected destination SIEM application may be identified. The at least one mainframe event may then be transmitted in the identified format from the mainframe event server module to the selected destination SIEM application.

19 Claims, 13 Drawing Sheets

MULTIPLE DESTINATIONS FOR MAINFRAME EVENT MONITORING

CROSS REFERENCES

The present application claims priority to U.S. Provisional Patent Application No. 61/470,333, entitled "MULTIPLE DESTINATIONS FOR MAINFRAME EVENT MONITORING," filed on Mar. 31, 2011, the entire disclosure of which is incorporated herein by reference in its entirety for all purposes. The present application is related to U.S. patent application No. 13/437,624, filed concurrently herewith, entitled "MAINFRAME MANAGEMENT CONSOLE MONITORING," and U.S. patent application No. 13/437,636, filed concurrently herewith, entitled "MAINFRAME EVENT CORRELATION," each of which is incorporated by reference in its entirety for all purposes.

BACKGROUND

The present invention relates to mainframe event and message processing in general and, in particular, to the creation and monitoring of records related thereto. Mainframes, in the course of operation, create and monitor a variety of events and other messages (e.g., syslog messages), which contain various information regarding mainframe operations. These records may be analyzed for a variety of purposes. A mainframe may assign specific codes to the event or other messages depending on the triggering circumstance, and also may provide access to the stored records.

The information contained within the mainframe event records may be valuable to third party applications. For example, by analyzing event record codes and event information, third parties may be able to identify various conditions and processing incidents on and recorded by the mainframe. This event record information may disclose a security violation detected on the mainframe system, a mainframe memory issue, an application error, or a variety of other mainframe operations and processing incidents.

In many instances, the high number, variety, and frequency of events recorded on the mainframe make it difficult for third parties to use this information efficiently. Also, the information contained in an event record is in a mainframe specific format (e.g., EBCDIC). Finally, third parties seeking to use event record information are confronted with challenges in interfacing with the mainframe because of the complexity and security.

SUMMARY

Methods, systems, and devices are described for mainframe event management.

In a first set of embodiments, a method for managing mainframe events may include receiving at least one mainframe event at a mainframe event server module communicatively coupled with a mainframe; converting the received at least one mainframe event to an open format; selecting a destination Security Information and Event Management (SIEM) application for the received at least one mainframe event based on a set of rules; identifying a format associated with the selected destination SIEM application; and transmitting the at least one mainframe event in the identified format from the mainframe event server module to the selected destination SIEM application.

In a second set of embodiments, a mainframe event server system may include a reformatting module, a destination selection module, and a routing module. The reformatting module may be configured to receive at least one mainframe event associated with a mainframe and convert the received at least one mainframe event to an open format. The destination selection module may be configured to select a destination Security Information and Event Management (SIEM) application for the received at least one mainframe event based on a set of rules and identify a format associated with the selected destination SIEM application. The routing module may be configured to transmit the at least one mainframe event in the identified format from the mainframe event server module to the selected destination SIEM application.

In a third set of embodiments, a mainframe event server system for may include at least one processor and at least one memory communicatively coupled with the at least one processor. The at least one memory may include executable code that, when executed by the at least one processor, causes the at least one processor to: receive at least one mainframe event associated with a mainframe; convert the received at least one mainframe event to an open format; select a destination Security Information and Event Management (SIEM) application for the received at least one mainframe event based on a set of rules; identify a format associated with the selected destination SIEM application; and transmit the at least one mainframe event in the identified format from the mainframe event server module to the selected destination SIEM application.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
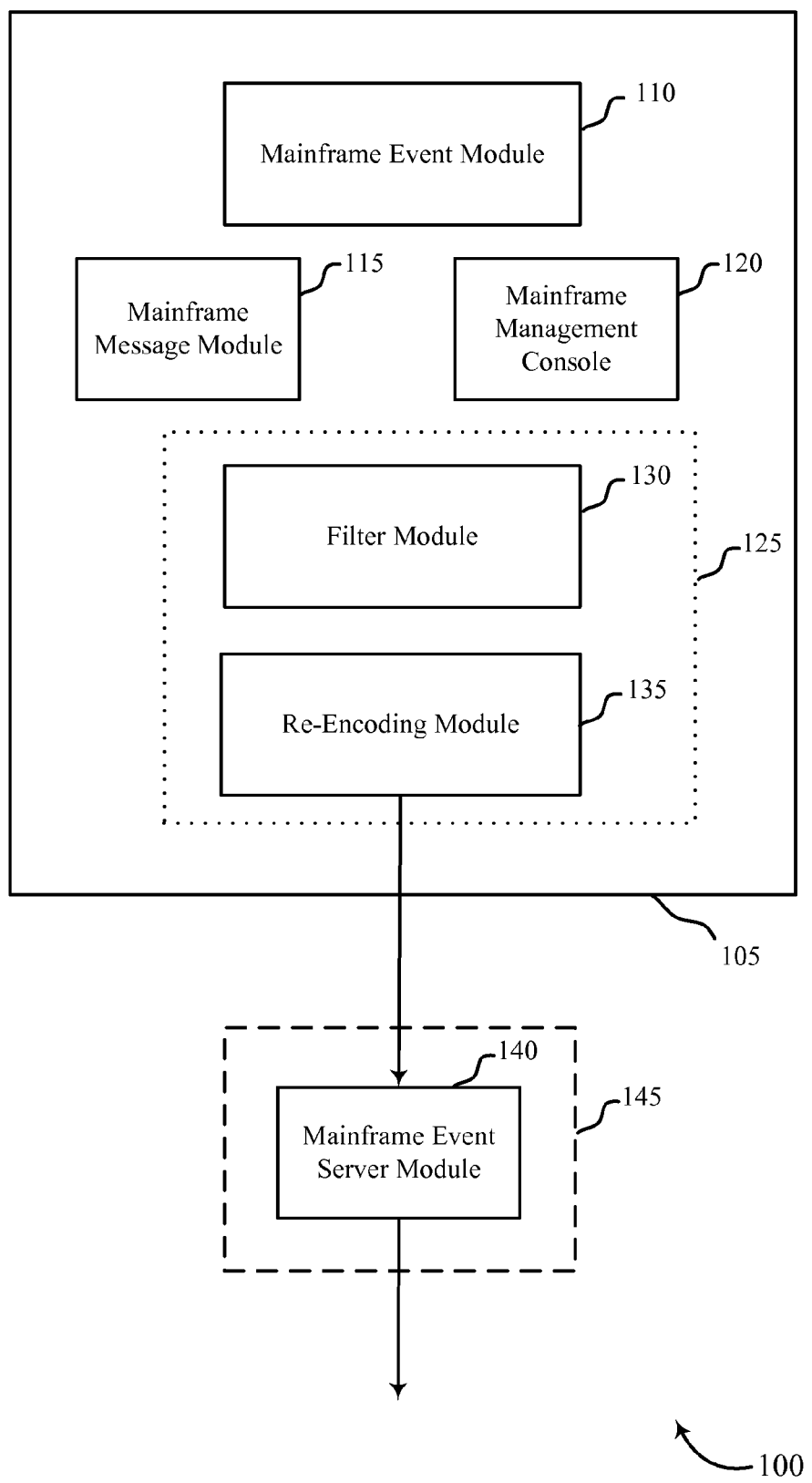
FIG. 1 is a block diagram of an example system including components configured according to various embodiments of the invention.

Methods, systems, and devices are described for monitoring and managing mainframe events. In the methods, systems, and devices of the present disclosure, mainframe events may be detected, reformatted, and selectively routed to one or more destination Security Information and Event Management (SIEM) applications based on a set of rules. In this way, mainframe events may be integrated with events from other sources in one or more SIEM applications.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of the present disclosure and appended claims, the term "mainframe" refers broadly to a computer system capable of supporting a substantial number (hundreds, thousands, or more) of substantially simultaneous applications and/or users.

For purposes of the present disclosure and appended claims, the term "event" refers broadly to a logged occurrence of an action within an operating system or computer program environment.

For purposes of the present disclosure and appended claims, the term "message" refers broadly to a logged record. A message may be directed to a recipient, or simply a portion of a stored record or log.

For purposes of the present disclosure and appended claims, the term "mainframe console" or "mainframe management console" refers broadly to a command-line interface of a mainframe operating system.

For purposes of the present disclosure and appended claims, the term "Security Information and Event Management (SIEM) application" refers broadly to a computer program configured to provide real-time analysis of security issues in a system based on messages or events received from one or more computer systems in a network. As used herein, the term SIEM application generically refers to both Security Information Management (SIM) applications and Security Event Management (SEM) applications. For purposes of the present disclosure, the terms "SIEM application," "SIM application," and "SEM application" are synonymous and interchangeable.

For purposes of the present disclosure and appended claims, the term "mainframe event server module" refers to a hardware implemented module that receives mainframe events associated with a mainframe and distribute those events to one or more third party SIEM applications.

Systems, devices, methods, and software are described for a mainframe event and message processing system 100. In one set of embodiments, shown in FIG. 1, a system 100 includes a mainframe 105 and a mainframe event server module 140. These components may be in communication with each other, directly or indirectly (e.g., via a network). While the illustrated example shows the mainframe event server module 140 residing on server computer system 145 independent from the mainframe 105, in other embodiments the mainframe event server module 140 may be integrated in varying degrees with the mainframe 105.

Components on the mainframe 105 include a mainframe event module 110, a mainframe message module 115, a mainframe management console 120, an event/message filter module 130, and a re-encoding module 135. A mainframe 105 is a high-level system designed for more computationally intensive jobs, and is often utilized by large organizations for managing and executing a variety of complex computer systems and applications. Unlike typical home and business computers, mainframes are designed to handle very high volume input and output with increased computing throughput. Like a typical computer, the mainframe 105 runs an operating system (e.g., IBM's z/OS) that provides functionality including starting and stopping applications, managing memory allocation and access, and reporting a variety of system events.

The mainframe event module 110 may detect, generate, process and/or store events of the mainframe operating system. The events may be system management facility (SMF) events, or be any number of other types of events. The mainframe event module 110 may be integrated in whole or in part with the mainframe 105 operating system, be a separate and distinct control unit on the mainframe 105, or be program or application running on the mainframe 105 operating system. The mainframe event module 110 may process system events reported and forwarded by the operating system and other mainframe systems. The mainframe event module 110 may generate and/or receive the event. During operation, the mainframe 105 operating system may report a variety of mainframe system events indicating various states, actions or system failures, such as a failure to start or complete an action, or a report of unauthorized access of a file on the mainframe 105. These events may be collected by the mainframe event module 110 for storage in an event record database (not specifically shown, although it may be part of mainframe event module 110-a). The mainframe event module 110-a may include a number of sub-modules (e.g., separate sub-modules for system, application, and security), and include a number of different event record databases.

To differentiate the various events reported by the mainframe, unique event codes may be assigned to records of different types mainframe events. Type 80, Type 101 and Type 102 are examples of codes of different "types" of events, and there may be codes for "sub-types" as well. As noted above, in one embodiment the events are SMF events. The SMF events may include DB2, customer information control system (CICS), Resource Access Control Facility (RACF), and other password violation and denied resource access attempt-related events as well as those generated by any application running on the mainframe 105.

As noted, the mainframe event module 110 may include an event record database, or they may be distinct components of the mainframe 105. For example, the mainframe event module 110 may collect events reported by the mainframe and forward the events to a mainframe event record database. The IBM z/OS System Management Facility interface is one example of such a mainframe event module 110.

The mainframe message module 115 may receive, process, generate, and store messages and records related to mainframe events. The mainframe message module 115 may be integrated to varying degrees with the mainframe operating system, be a separate and distinct control unit on the mainframe 105, or be a program or application running on the mainframe 105 operating system. The mainframe message module 115 may process messages reported and forwarded by the mainframe 105 operating system, including the mainframe event module 110, or various programs or applications running thereon or related thereto. During operation, components, programs, or applications associated with the operating system may generate or trigger the generation of a range of informational messages. These messages may be reported to the mainframe message module 115, or may trigger the mainframe message module 115 to generate such messages.

These messages may include, for example, syslog messages directed to a mainframe management console 120. Syslog is an open standard that may be used for system management and security auditing, as well as generalized informational, analysis, and debugging messages. It is supported by a wide variety of devices and programs across multiple platforms. Because of this, syslog may be used to integrate log data from many different types of systems into a central repository, such as the mainframe management console 120.

In additional or alternative examples, these messages may be messages or other information from a database server or manager (e.g., an Information Management System (IMS), or IBM DB2) or a transaction server (e.g., a customer information control system (CICS) or application programs developed or purchased by a customer). The respective servers and sources of information may be on or off the mainframe 105. To differentiate the various messages, unique message codes may be assigned to different types of messages. There may be a variety of formats for different messages (e.g., in one example, the first part of the message code may identify the application, and the second part of the code may identify the message type).

The filter module 130 may directly or indirectly monitor the mainframe event module 110-*a* and mainframe message module 115 for messages or events matching one or more criteria (e.g., monitoring for identifiers or other types of codes associated with event types or message types). The filter module 130 may be a software process that runs on the mainframe 105. The filter module 130 may copy or otherwise retain message data associated with the specified mainframe event or message types, and route them to the re-encoding module 135. An administrator may specify the types of events and/or messages trapped (e.g., using a web-based graphical user interface (GUI) or input parameters). An administrator may modify the filter criteria dynamically (e.g., without rebooting the mainframe 105). The criteria may change based on the time of day, day of the week, identity of the user, etc.

Thus, in one embodiment, the filter module 130 may monitor the codes of the various event-related messages being transmitted to or from mainframe event module 110-*a* and/or mainframe message module 115, and copy a relevant subset of messages matching certain criteria to identify a plurality of selected mainframe events. The re-encoding module 135 may receive the events and/or messages from the filter module 130. The re-encoding module 135 may be a software process that runs on the mainframe 105 operating system. The re-encoding module 135 may be from a proprietary mainframe format (e.g., Extended Binary Coded Decimal Information Code (EBCDIC)) into a common machine readable format (e.g., American Standard Code for Information Interchange (ASCII)). Most modern character-encoding schemes are based on ASCII, and proprietary mainframe formats are not commonly used outside of a mainframe environment by non-mainframe systems and third party applications. The re-encoding module 135 may perform other types of re-encoding, as well. In other embodiments, the re-encoding module 135 need not be used (e.g., if a message was already formatted in ASCII). It is worth noting that while the filter module 130 and re-encoding module 135 are depicted as residing as a unit 125 of the mainframe 105, any part of these modules or their functionality may be located off the mainframe (e.g., at server computer system 145).

The re-encoded event or message from re-encoding module 135 may then be forwarded to the mainframe event server module 140. The re-encoding module 135 may group a number of messages for transmission together (e.g., at a user defined interval). The mainframe event server module 140, upon receiving a mainframe event or message, may process the raw, reformatted event or message (e.g., in ASCII), and generate a translated version of that data in open data standard format (e.g., the common event format (CEF)). The mainframe event server module 140 may route and transmit the open data standard format event or message record to any number of different destinations. The mainframe event server module may be running on Windows, UNIX, LINUX, or other operating systems. In certain examples, the mainframe event server module 140 may be implemented in Java to allow for greater platform independence. However, other programming languages and platforms may be used in other examples (e.g., Python, Ruby, Scala, or Clojure).

The server computer system 145 hosting the mainframe event server module 140 performing the conversion, routing, and transmission may be fully located within a single facility or distributed geographically, in which case a network may be used to integrate different components. Although the illustrated embodiment shows that a server computer system 145 hosting the mainframe event server module 140 performs the conversion, in other examples these functions may be performed by the mainframe 105 or a virtual server.

Event and message data, in various forms, may be stored in one or more data stores on mainframe 105 and server computer system 145. A data store may be a single database, or may be made up of any number of separate and distinct databases. The data store may include one, or more, relational databases or components of relational databases (e.g., tables), object databases, or components of object databases, spreadsheets, text files, internal software lists, or any other type of data structure suitable for storing data. Thus, it should be appreciated that a data store may each be multiple data storages (of the same or different type), or may share a common data storage with other data stores. In some embodiments the data store may be distinct from the mainframe 105 and the server computer system 145, while in other embodiments it may be integrated therein to varying degrees.

The components of the system 100 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 2:
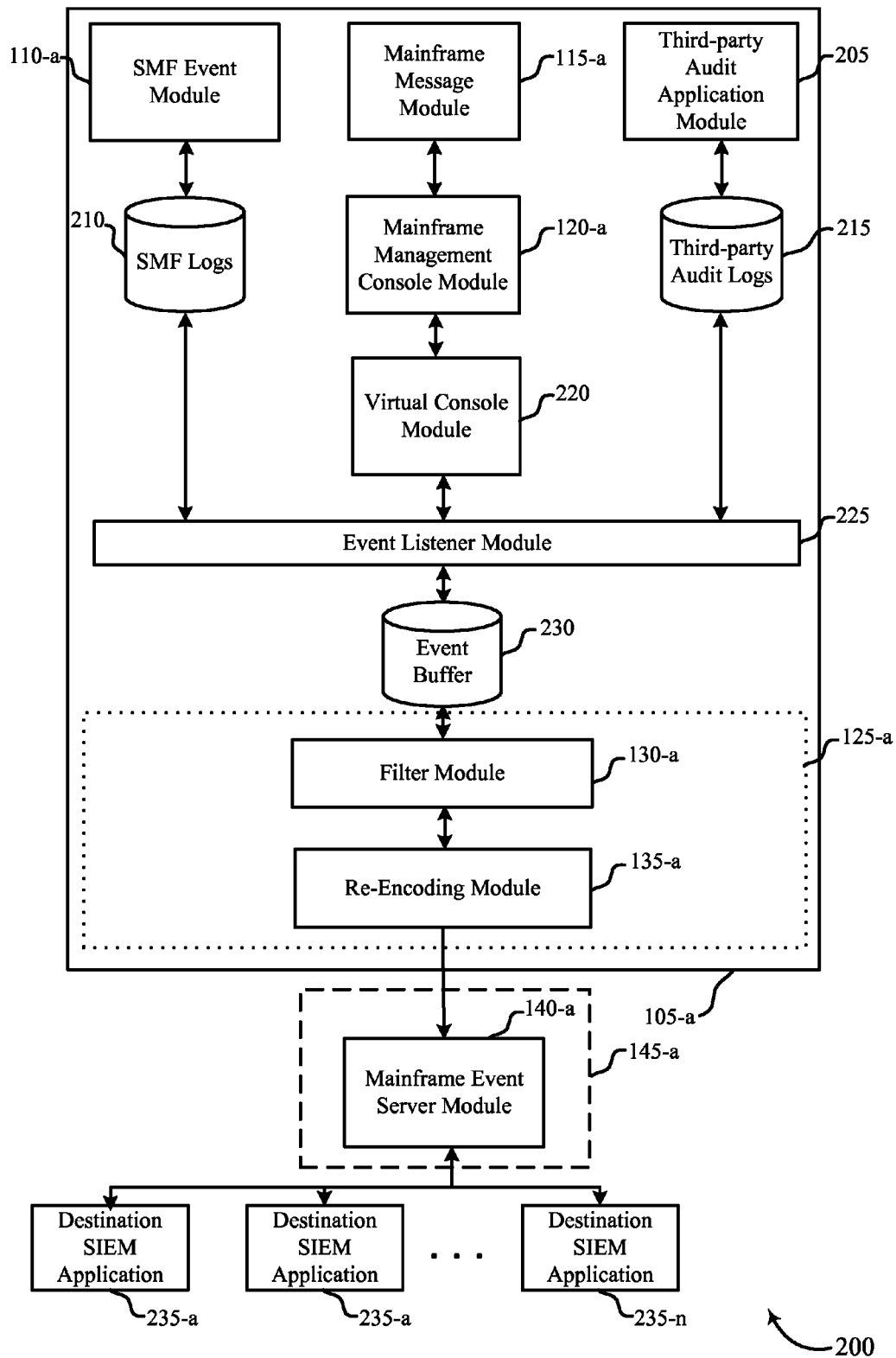
FIG. 2 is a block diagram of an example system including components configured according to various embodiments of the invention.

FIG. 2 is a block diagram of another example system 200 for monitoring and management. The system 200 includes a mainframe 105-*a*, a mainframe event server module 140-*a*, and a number of destination SIEM applications 235. These components may be in communication with each other, directly or indirectly (e.g., via a network). The system 200 may be an example of the system 100 described above with reference to FIG. 1. While the illustrated example shows the mainframe event server module 140 residing on server computer system 145 independent from the mainframe 105, in other embodiments the mainframe event server module 140 may be integrated in varying degrees with the mainframe 105. One or more of the destination SIEM applications 235 may reside on mainframe 105-*a*, on the server computer system 145 of the mainframe event server module 140-*a*, and/or on a separate computer system.

In the present example, the mainframe 105-*a* includes a mainframe SMF event module 110-*a*, an SMF log data store 210, a mainframe message module 115-*a*, a mainframe management console module 120-*a*, a virtual console module 220, a third-party security audit application module 205, a third-party audit log data store 215, an event listener module 225, an event buffer data store 230, a filter module 130-*a*, and a re-encoding module 135-*a*. Each of these components may be in communication, directly or indirectly. The mainframe SMF event module 110-*a* may be an example of the mainframe event module 110 described above with reference to FIG. 1. Similarly, the mainframe message module 115-*a* and mainframe management console module 120-*a* may be examples of the mainframe message module 115 and mainframe management console module 120 described above with reference to FIG. 1. The filter module 130-*a* and re-encoding module 135-*a* may be examples of the filter module 130 and re-encoding module 135 described above with reference to FIG. 1.

The SMF event module 110-*a* may detect and generate SMF events, which are recorded as log messages in the SMF log data store 210. The mainframe message module 115-*a* may detect and direct system messages to the mainframe management console module 120-*a*, which allows an administrator to view the messages. Some or all of these messages may also be mirrored and copied to the virtual console module 220 for use in detecting events without disturbing the flow of the mainframe management console module 120-*a*.

The third-party security audit application module 205 may monitor and log certain actions and events taken at the mainframe 105-*a* that are not recorded by the SMF event module 110-*a* or the mainframe message module 115-*a*. In one example, the third-party security audit application module 205 may run a CA TOP SECRET application to monitor the types of security administrative commands issued by a system administrator and other actions that are not monitored by the SMF event module 110-*a* or the mainframe management console module 120-*a*. The TOP SECRET application may be periodically invoked to produce a new audit file on a regular basis, and each audit file may be stored at the third-party audit logs data store 215. Additional or alternatively, any other suitable type of mainframe security audit application may be invoked at the third-party security audit application module 205 to produce audit logs for the third-party audit logs data store 215.

The event listener module 225 may communicate with the SMF logs data store 210, the virtual console module 220, and the third-party audit logs data store 215 to identify mainframe events. These mainframe events may be copied and consolidated in the event buffer data store 230. In certain examples, the event listener module 225 may convert one or more records in the SMF logs data store 210, the virtual console module 220, or the third-party audit logs data store 215 such that all of the events written to the event buffer data store 230 are in the same format. As a large number of mainframe events may occur in a short amount of time, the event buffer data store 230 may have the capability of storing records corresponding to millions of mainframe events or more.

The filter module 130-*a* may filter the mainframe events in the event buffer data store 230 to select mainframe events according to one or more filtering criteria input by an administrator. The filtering criteria may be as granular or generic as may suit the specifications of a particular administrator or mainframe 105-*a*. In one example, the filtering criteria may select all events in the event buffer data store 230 having a specific code. Additionally or alternatively, the filtering criteria may select all events in the event buffer data store 230 that begin with or contain a certain string of letters. The filtering criteria may be static, or may be dynamically changed over time. In certain examples, the filtering criteria may be dynamically updated in real-time by an administrator. Additionally or alternatively, the filtering criteria may automatically change based on time of day, mainframe usage, the type or number of applications or clients associated with the mainframe at a given time, and/or any other criteria that may suit a particular application of the principles described in the present disclosure.

The re-encoding module 135-*a* may convert the events selected by the filter module 130-*a* from a character encoding scheme associated with the mainframe (e.g., EBCDIC) to a more generic character encoding scheme (e.g., ASCII). In certain examples, the re-encoding module 135-*a* may perform the first of a series of re-encoding/reformatting steps that are performed on the selected events. For instance, the re-encoding module 135-*a* may convert the selected events from EBCDIC to ASCII, and the mainframe event server module 140-*a* may convert all of the selected events to the common event format (CEF). In certain examples, the mainframe event server module 140-*a* may further convert one or more of the selected events to a format compatible with a destination STEM application 235. Once the selected events have undergone all appropriate re-encoding and reformatting, the mainframe event server module 140-*a* may apply a set of rules to select an appropriate destination STEM application 235 for the selected events and route the selected events to the one or more selected destination SIEM applications 235.

Figure 3:
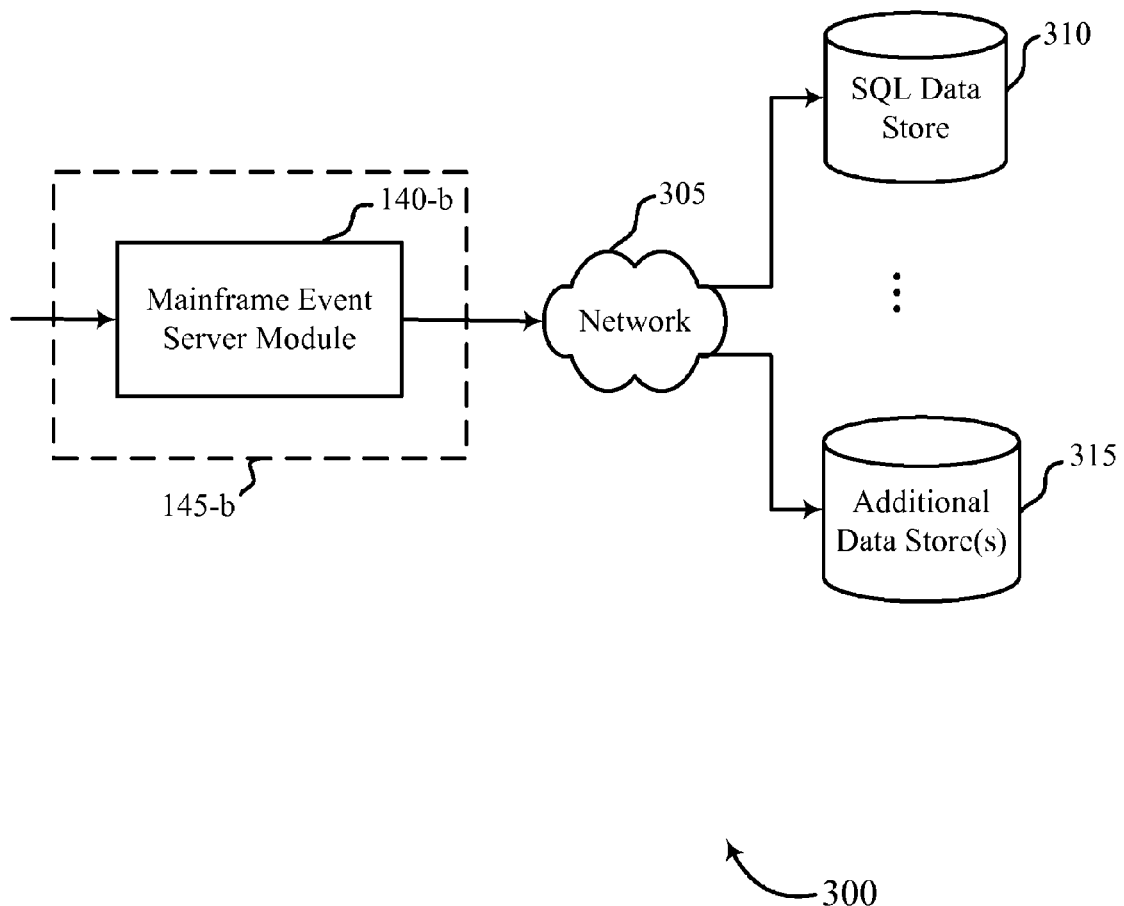
FIG. 3 is a block diagram of an example system including components configured according to various embodiments of the invention.

FIG. 3 is a block diagram of a system 300 for event and message processing. The system 300 of the present example may include a number of aspects of the system 100 described with reference to FIG. 1 or the system 200 described with reference to FIG. 2, each of which illustrates an example of the mainframe event and message processing system. The system 300 of FIG. 3 includes a mainframe event server module 140-*b* operating on a server computer system 145-*a*, a network 305, SQL data store 310, and one or more additional data stores 315. The mainframe event server module 140-*b* may receive an event or message from a mainframe (e.g., the raw data from a reformatted event or message in ASCII described with reference to the mainframe 105 of FIG. 1 or FIG. 2). The mainframe event server module 140-*b* may generate a translated version of that event or message data in open data standard format (e.g., the common event format (CEF)).

The mainframe event server module 140-*b* may also determine destinations for the data based on user input or other rules. The destinations may include any number of different security information management (SIM) or security event management (SEM) applications (hosted or otherwise), which are collectively characterized as SIEM applications in the present disclosure. By way of example, such SIEM applications may include applications from ARCSIGHT, NITROSECURITY, and MCAFEE. The mainframe event server module 140-b may reformat one or more events or message in open data standard format (e.g., CEF), changing the event or message into a proprietary format associated with a selected SIEM application. The reformatted event/message data may be routed to an additional data store 315 associated with the selected SIEM application. In addition, or alternatively, the destination may be an SQL data store 310. The mainframe event server module 140-B may reformat the event or message in the open data standard format (e.g., CEF), changing the event or message into a format for storage on SQL data store 310.

Thus, the mainframe event server module 140-b may receive an event or message in ASCII, and may translate that data to an open data standard format. The mainframe event server module 140-b may determine a destination for the event or message (e.g., an SQL data store 310, or a proprietary SIEM application). If the destination needs to receive data in a certain format, the mainframe event server module 140-b may reformat the data (e.g., into a format associated with the SIEM application, or the SQL database). In some embodiments, the destination may use the open data standard format, in which case the data may be forwarded in the open data standard format.

Figure 4:
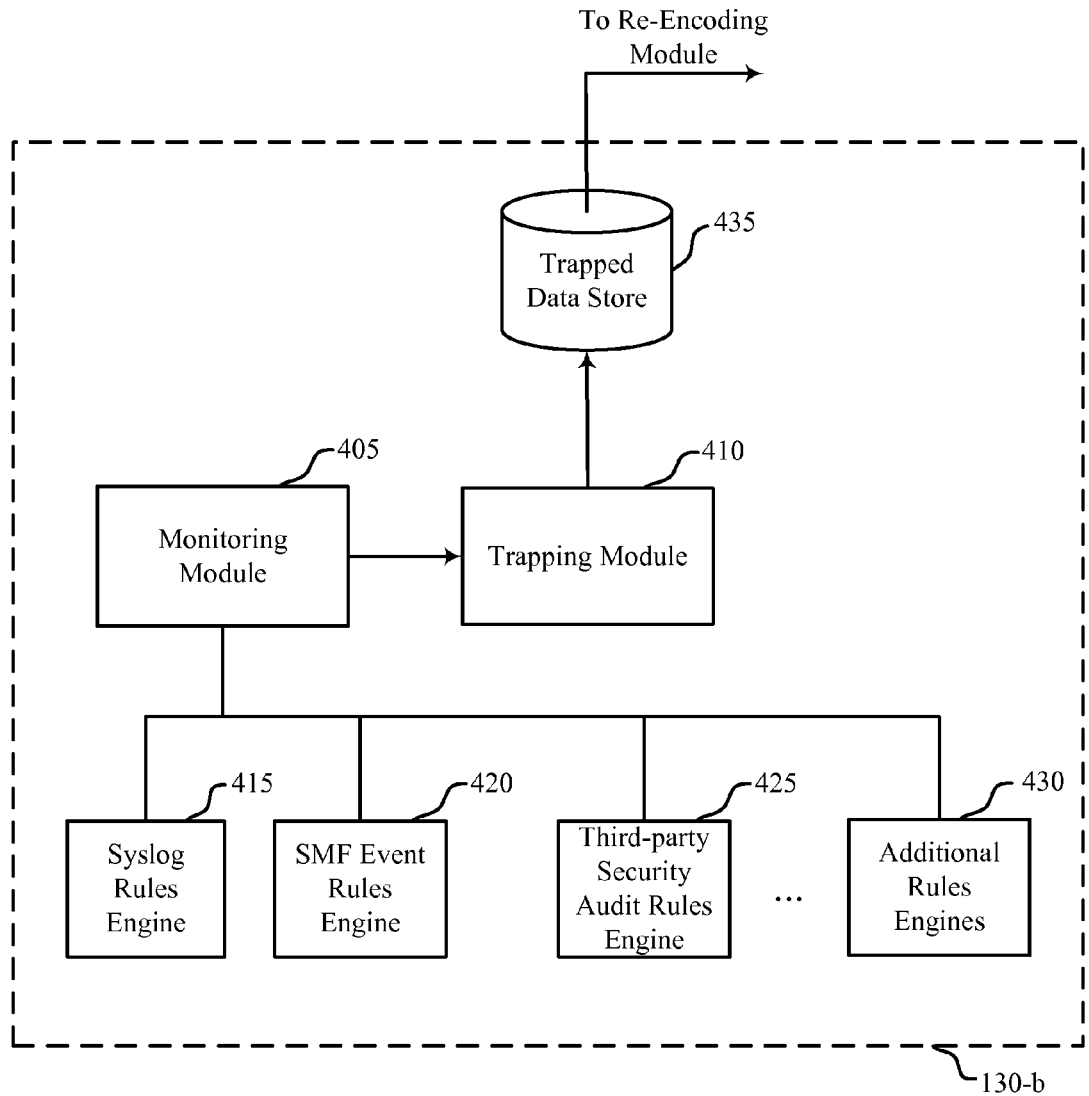
FIG. 4 is a block diagram of an example filter module including components configured according to various embodiments of the invention.

FIG. 4 is a functional block diagram 400 illustrating one embodiment of a filter module 130-b. The filter module 130-b of FIG. 4 may be an example of the filter module 130 described with reference to FIG. 1. Filter module 130-b includes monitoring module 405, trapping module 410, Syslog rules engine 415, an SMF event rules engine 420, third-party audit file rules engine 425, additional rules engines 430, and trapped data store 435. These components may be integrated into a mainframe (e.g., mainframe 105 of FIG. 1), or portions of the functionality may be located on a server computer system off of a mainframe (e.g., server computer system 145 of FIG. 1).

The monitoring module 405 may monitor events detected by an event listener module (e.g., event listener module 225 of FIG. 2) as they are logged at an event buffer data store (e.g., event buffer data store 230 of FIG. 2). The events may be in EBCDIC or ASCII formats. The monitoring module 405 may monitor for specific types and/or sub-types of events (e.g., by matching codes of interest with the codes of events that have actually occurred, or otherwise listening for certain event codes). The monitoring may be according to the filtering criteria set by an administrator or other user. These filtering criteria may be defined by the rules engines 415, 420, 425, 430. In the present example, a Syslog rules engine 415 identifies events derived from syslog messages that are to be selected (e.g., based on syslog message codes) according to a first set of rules, an SMF event rules engine 420 identifies types and sub-types of SMF events that are to be selected (e.g., based on codes and/or content) according to a second set of rules, a third-party security audit file rules engine 425 that identifies events derived from third-party security application audit files that are to be selected according to a third set of rules. There may be additional rules engines 430 in communication with the monitoring module 405 identifying other types of events that should be trapped.

Thus, the monitoring module 405 analyzes the various mainframe events and messages, and identifies events and messages of interest according to criteria identified by the rules engines 415, 420, 425, 430. When an event or message of interest is identified and selected by the monitoring module 405, the monitoring module 405 may communicate with the trapping module 410 to copy or otherwise retain all or part of the event or message. The trapping module 410 may store all or part of the event or message in the trapped data store 435. The events or messages may be forwarded, individually or in groups, from the trapped data store 435. These messages may then be forwarded for re-encoding and/or reformatting (e.g., from EBCDIC to ASCII, and/or into an open data standard format, and/or into a format for an SQL database and/or SIM/SEM application, and/or another type of data store).

FIGS. 5A-5D are block diagrams illustrating various example systems 500, 550, 560 of mainframe event server modules 140 routing mainframe events to one or more destination SIEM applications 235. The mainframe event server modules 140 shown in FIGS. 5A-5D may be examples of the mainframe event server module 140 described above with reference to FIG. 1 or FIG. 2. Similarly, the destination SIEM applications 235 of FIGS. 5A-5D may be examples of the destination SIEM applications 235 described above with reference to FIG. 2.

The mainframe event server 140 of FIGS. 5A-5D includes a reformatting module 505, a routing module 510, and a destination selection module 515. Each of these components may be in communication, directly or indirectly.

The reformatting module 505 may be configured to receive raw mainframe events associated with a mainframe and convert the received raw mainframe events to an open format. For example, the raw mainframe event may be received at the mainframe event server module 140-c from a re-encoding module (e.g., re-encoding module 135 of FIG. 1 or FIG. 2) or directly from a mainframe 105-a.

While the raw mainframe event may have be converted into a generic character encoding scheme (e.g., ASCII) prior to receipt by the mainframe event server module 140, the raw event may still be in its original mainframe format. Thus, the reformatting module 505 may convert the raw event into an open format. One example of an open format that may be used for this purpose is the Common Event Format (CEF). The open format may be understood and accepted by multiple types of destination SIEM applications 235. Additionally or alternatively, the reformatting of the raw event into the open format may be an important intermediate step in ultimately converting the event into a proprietary or less-common format accepted by a particular destination SIEM application 235.

Figure 5A:
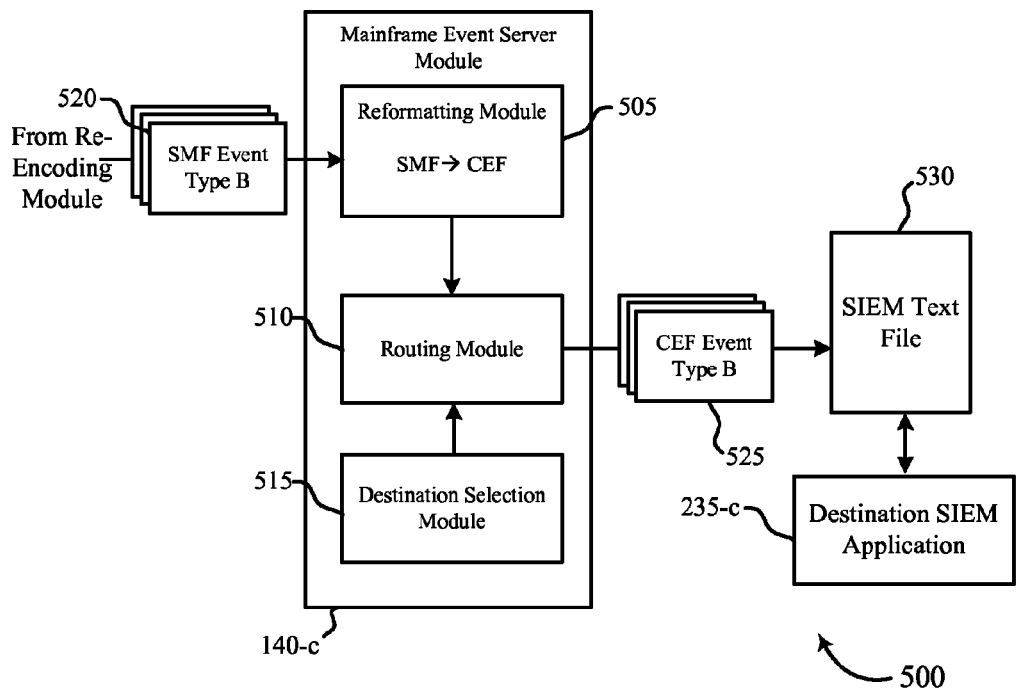
FIGS. 5A-5D are block diagrams of example systems including components configured according to various embodiments of the invention.
Figure 5B:
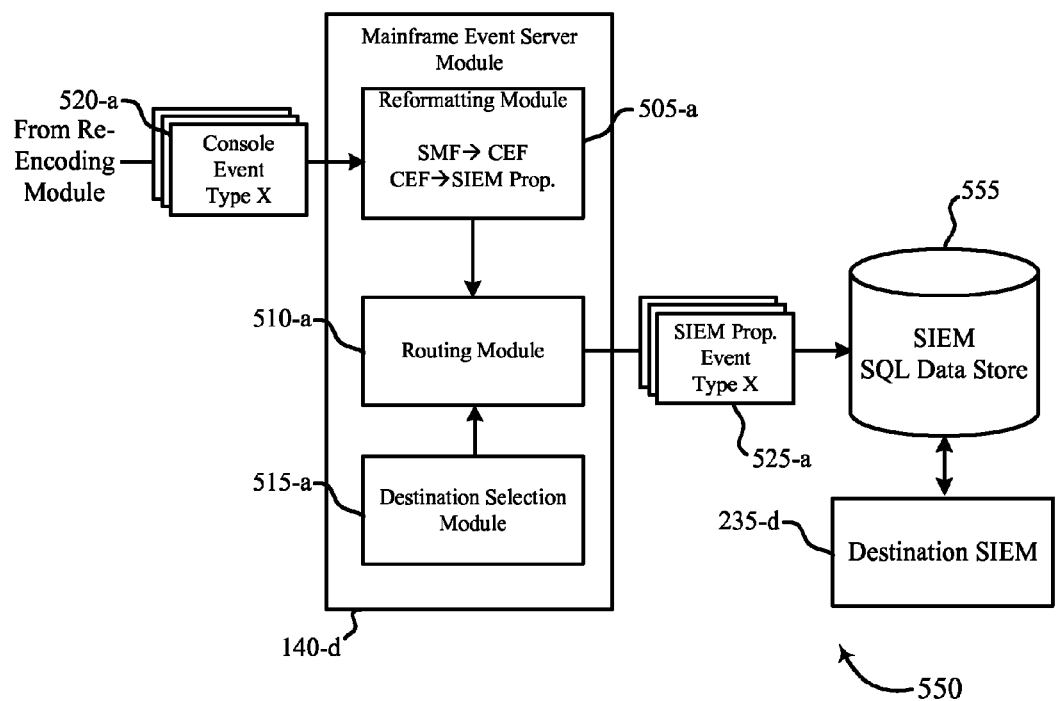
Figure 5C:
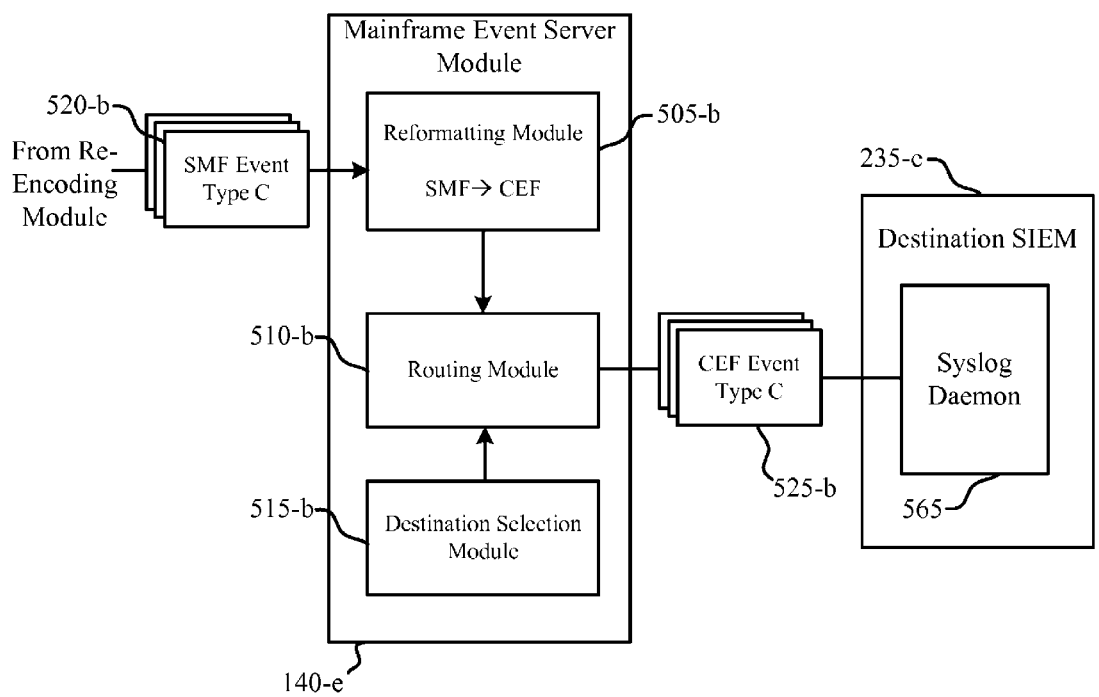
Figure 5D:
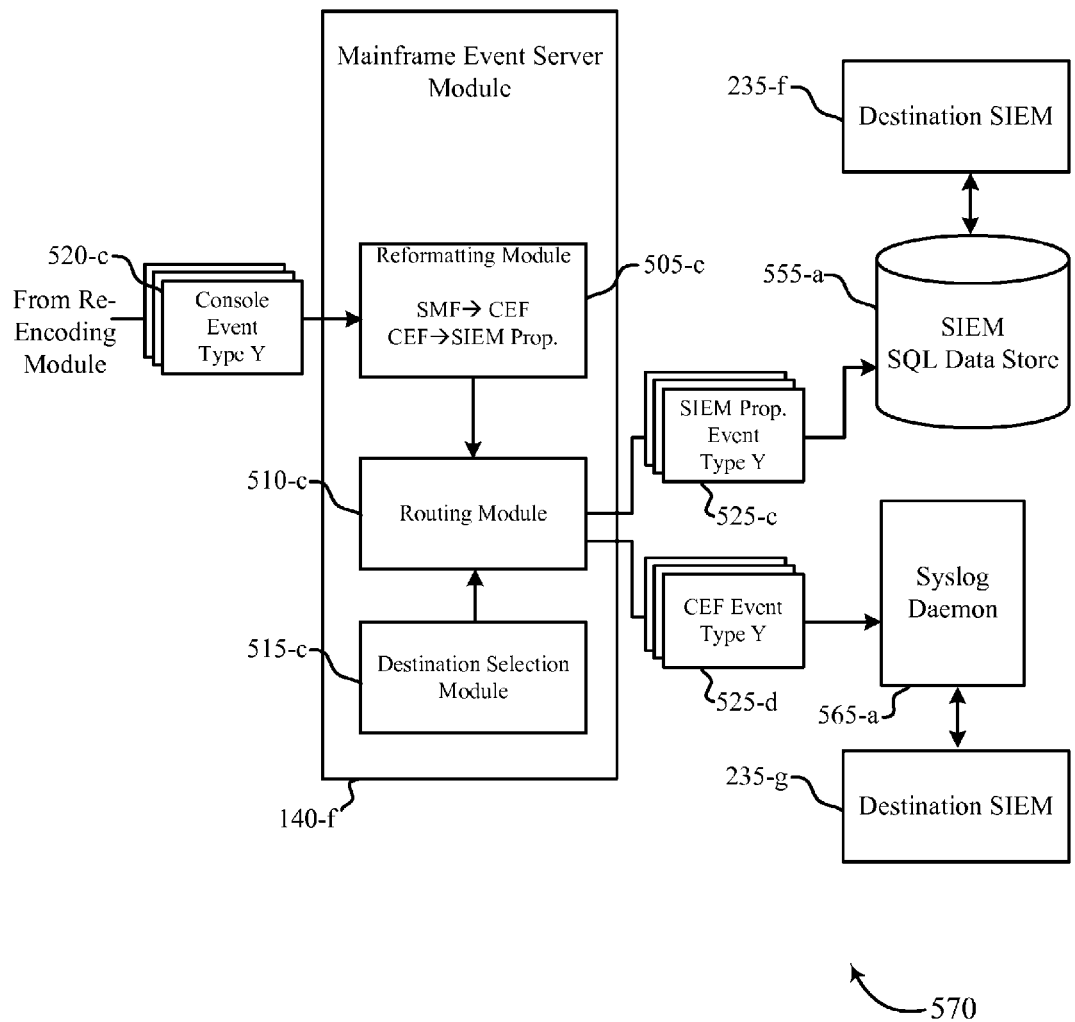

The destination selection module 515 may select a destination STEM application 235 for the received mainframe events based on a set of rules. The rules for selecting the destination SIEM application may be based on time-of-day, type of event, content of event, security policies, access policies, and/or any other criteria that may suit a particular application of these principles. The destination selection module 515 may further identify a format associated with the selected SIEM application(s). This format may be the open format, as shown in FIGS. 5A and 5C, or a proprietary format accepted by the destination SIEM application 235, as shown in FIGS. 5B and 5D. In examples where the selected destination SIEM application 235 accepts only a certain format, the reformatting module 505 may convert the mainframe event from the open format to the format accepted by the selected destination SIEM application 235. Alternatively, the reformatting module 505 may convert one or more mainframe events directly from the mainframe format in which the events are received to the format accepted by the selected destination SIEM application 235 without the intermediate step of first converting the mainframe event to an open format.

The routing module 510 of the mainframe event server module 140-c may transmit the mainframe events to the selected destination SIEM application(s) 235 in the format identified for the SIEM application(s) 235. This transmission may occur in a number of ways, as shown in FIGS. 5A-5D.

Referring now to the example of FIG. 5A, an SMF mainframe event 520 may be received at the reformatting module 505 of mainframe event server module 140-c. The reformatting module 505 may convert the received event 520-a to the open CEF format. Destination selection module 515 may apply a set of rules to identify destination SIEM application 235-c for the received event, and determine that the CEF format is accepted by the destination SIEM application 235-c. The routing module 510 may then write the CEF version of the event 525 to a text file 530 in a folder on a server associated with the destination SIEM application 235-c. The destination SIEM application 235-c may monitor the text file 530 for changes to detect new mainframe events from the mainframe event server module 140-c.

Referring now to the example of FIG. 5B, a console mainframe event 520-a may be received at reformatting module 505-a of mainframe event server module 140-d. The reformatting module 505-a may convert the received event 520-a to the open CEF format. Destination selection module 515-a may apply a set of rules to identify destination SIEM application 235-d for the received event, and determine that the destination STEM application 235-d only accepts events in a proprietary SIEM format. The reformatting module 505-a may then convert the CEF version of the event to the proprietary SIEM format, and the routing module 510-a may write the event 525-a in the proprietary format to a SQL data store 555 associated with the destination SIEM application 235-d. The destination SIEM application 235-d may retrieve events logged by the mainframe event server module 140-d through queries to the SQL data store 555.

Referring now to the example of FIG. 5C, an SMF mainframe event 520-b may be received at reformatting module 505-b of mainframe event server module 140-e. The reformatting module 505-b may convert the received event 520-b to the open CEF format. Destination selection module 515-b may apply a set of rules to identify destination SIEM application 235-e for the received event, and determine that that the CEF format is accepted by the destination SIEM application 235-e. The routing module 510-b may then write the event 525-b in the proprietary format to a syslog daemon 565 associated with the destination SIEM application 235-e. The destination SIEM application 235-e may receive the event 525-b through the syslog daemon 565.

Referring now to the example of FIG. 5C, an SMF mainframe event 520-b may be received at reformatting module 505-b of mainframe event server module 140-e. The reformatting module 505-b may convert the received event 520-b to the open CEF format. Destination selection module 515-b may apply a set of rules to identify destination SIEM application 235-e for the received event, and determine that that the CEF format is accepted by the destination SIEM application 235-e. The routing module 510-b may then write the event 525-b in the proprietary format to a syslog daemon 565 associated with the destination SIEM application 235-e. The destination SIEM application 235-e may receive the event 525-b through the syslog daemon 565.

Referring now to the example of FIG. 5D, a console mainframe event 520-c may be received at reformatting module 505-c of mainframe event server module 140-f. The reformatting module 505-c may convert the received event 520-c to the open CEF format. Destination selection module 515-c may apply a set of rules to identify destination SIEM applications 235-f and 235-g for the received event 520-c. The destination selection module 515-c may further determine that destination SIEM application 235-f only accepts events in a proprietary SIEM format, while destination SIEM application 235-g accepts events in the open CEF format. The reformatting module 505-c may then convert a copy of the CEF version of the event to the proprietary STEM format, and the routing module 510-c may write the event 525-c in the proprietary format to a SQL data store 555 associated with the destination SIEM application 235-d. The routing module 510-c may further write the event 525-d in the CEF format to a syslog daemon 565-a associated with destination SIEM application 235-g.

Figure 6:
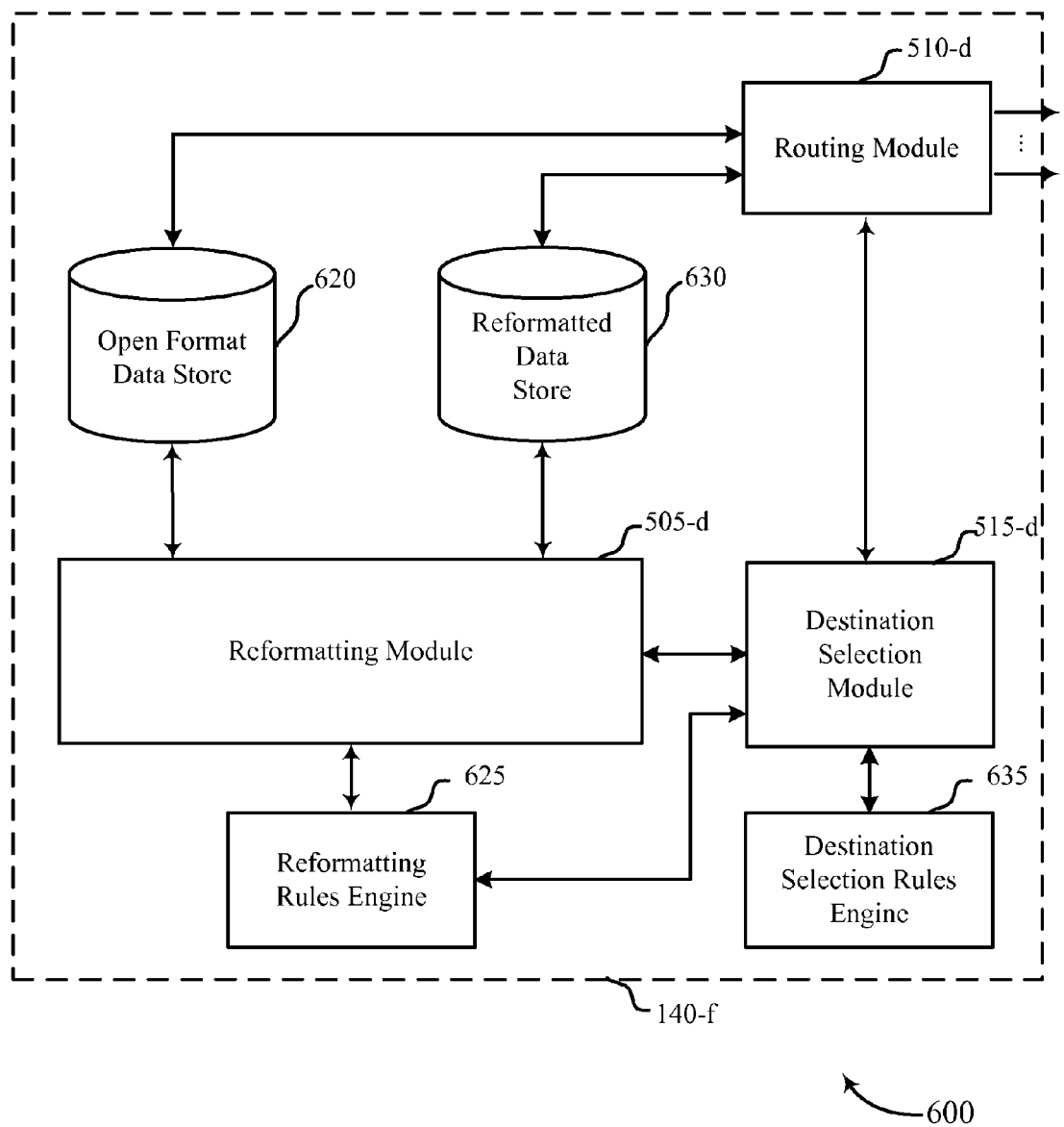
FIG. 6 is a block diagram of a mainframe event server module including components configured according to various embodiments of the invention.

FIG. 6 is a functional block diagram illustrating one example configuration 600 of a mainframe event server module 140-f. The mainframe event server module 140-f of the FIG. 6 may be an example of the mainframe event server module 140 of FIG. 1, FIG. 2, FIG. 3, or FIGS. 5A-5D. In the present example, the mainframe event server module 140-f includes a reformatting module 505-d, a destination selection module 515-d, a routing module 510-d, an open format data store 620, a reformatting rules engine 625, a reformatted data store 630, and a destination selection rules engine 635. These components may be integrated into a server computer system (e.g., server computer system 145 of FIG. 1 or 2), or portions of the functionality may be located on a mainframe (e.g., mainframe 105 of FIG. 1). This configuration 600 may be implemented using any suitable programming languages (e.g., Java, C, Python, Ruby, Scala, Clojure, etc.) in a variety of platforms (e.g., Windows, UNIX, LINUX).

A mainframe event or message may be received at reformatting module 505-d (e.g., from the mainframe 105 of FIG. 1), which may reformat the received raw ASCII data for the mainframe event to an open format (e.g., CEF) and store the event in the open format in the open format data store 620.

The destination selection module 515-d may use the destination selection rules engine 635 to determine one or more destinations for the received mainframe event. This selection may be based on administrator preferences, other user input, rules based on the type of event or content of the event, rules based on time of day, rules based on security parameters or profiles, other rules, and/or the like. The destinations may include any number of different SIEM applications (hosted or implemented otherwise). By way of example, such SIEM applications may include SIEM applications from ARCSIGHT, NITROSECURITY, or MCAFEE. In addition, or alternatively, the destination may be an SQL data store.

The destination selection module 515-d may further identify a format accepted by the selected destination(s). In certain examples, the format accepted by the selected destination(s) may be the open format to which the event has already been converted. In additional or alternative examples, the format accepted by the selected destination(s) may include one or more proprietary or other formats. If format accepted by the selected destination(s) includes a format that is not the open format, the reformatting module 505-d may reformat a copy of the event to the format accepted by the selected destination(s) and store this copy of the event in the reformatted data store 630.

The reformatting rules engine 625 may contain one or more libraries of reformatting rules for use by the reformatting module 505-d. The reformatting rules may be applied to reformat events to or from an open data standard format (e.g., CEF), a proprietary format associated with a destination SIEM application, and/or a SQL compatible format for storage in a SQL data store.

The routing module 510-d may access the reformatted event data, route the data to the applicable destination(s) (e.g., an SQL data store or SIM/SEM application data store), and transmit the appropriately formatted event data accordingly. An event may be transmitted to multiple locations, in the same or different formats. The routing module 510-d may be configured to group a set of messages or events for transmission together.

Figure 7:
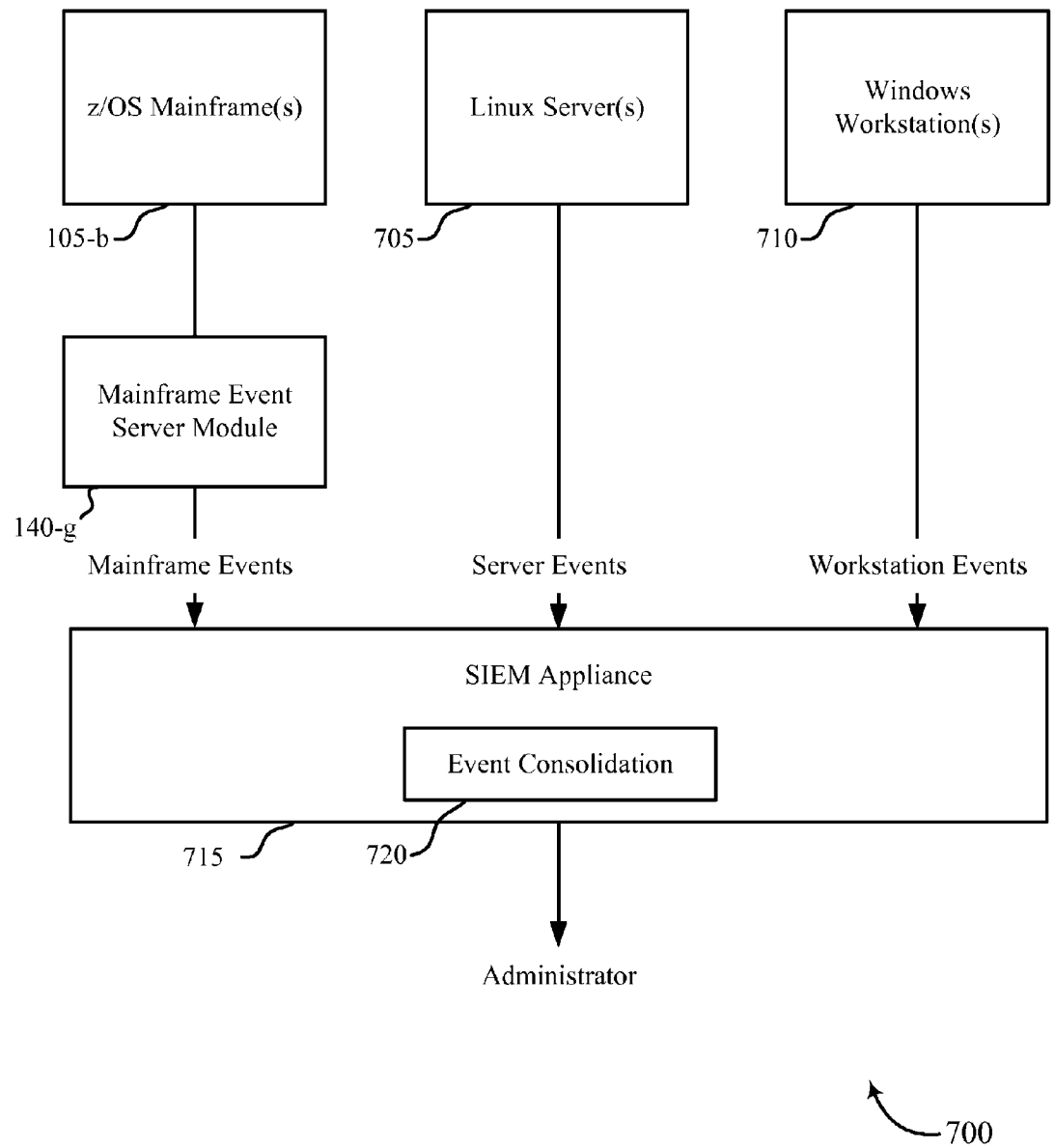
FIG. 7 is a block diagram of an example system including components configured according to various embodiments of the invention.

FIG. 7 is a functional block diagram illustrating one example of a system 700 including one or more z/OS mainframes 105-b, one or more Linux servers 705, and one or more Windows workstations 710. The mainframe(s) may be an example of the mainframe 105 described above with reference to FIG. 1 or FIG. 2. In the present example, the mainframe(s) 105-b, the server(s) 705, and the workstation(s) 710 are each able to output events to a single SIEM appliance 715. The SIEM appliance 715 may include a computing device running one or more SIEM applications (e.g., SIEM applications 235 of FIG. 2 or FIGS. 5A-5D). In certain examples, the SIEM appliance may be implemented by one or more of the mainframe(s) 105-b, server(s) 705, or workstation(s) 710.

In past systems, SIEM appliance 715 used to view events from servers 705 and workstations 710 have not been able to also view z/OS mainframe events. However, the mainframe(s) 105-b of the present example may be associated with a filter module (e.g., filter module 130 of FIG. 1, FIG. 2, or FIG. 4) which monitors the mainframe management console and other sources of data for mainframe events, a re-encoding module (e.g., re-encoding module 135 of FIG. 1 or FIG. 2), and a mainframe event server module 140-g. Collectively, these modules may work together as described above to provide SIEM appliance 715 with access to mainframe events of interest. In this way, the SIEM appliance 715 may consolidate events of interest received from mainframe and non-mainframe sources at an event consolidation module 720 and provide a unified view of the events to an administrator or other user.

Furthermore, by incorporating mainframe events into a SIEM appliance 715 that tracks server and workstation events, additional troubleshooting and deductive diagnostic capabilities may be introduced. For example, a set of rules may be applied to a combination of events of different types and from different sources to provide a more adequate view of system health.

Figure 8:
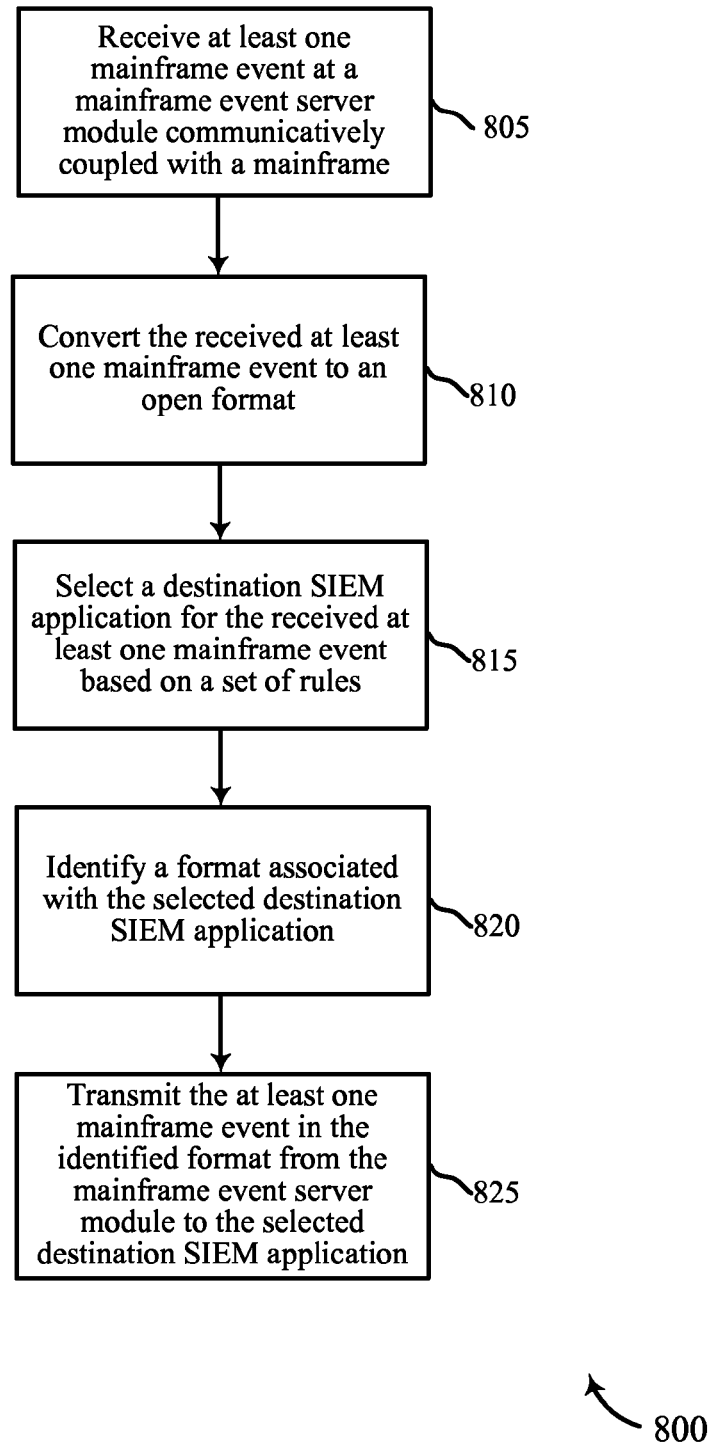
FIG. 8 is a flowchart diagram of an example method of managing mainframe events according to various embodiments of the invention.

Referring next to FIG. 8, a flow chart is shown illustrating an example method 800 for monitoring and managing mainframe events. This method 800 may, for example, be performed in whole or in part by the mainframe event server module 140 of FIG. 1, FIG. 2, FIG. 3, FIGS. 5A-5D, FIG. 6, or FIG. 7. As described above, the mainframe event server module 140 may be implemented in whole or in part by mainframe 105 of FIG. 1, FIG. 2, or FIG. 7, and/or by a separate computing device in communication with the mainframe.

At block 805, at least one mainframe event is received at a mainframe event server module communicatively coupled with a mainframe. The at least one mainframe event may include at least one event detected from a management console of the mainframe and/or at least one event detected from a log file (e.g., SMF log or third-party log file) generated at the mainframe. In certain examples, the at least one mainframe event may be received from a re-encoding module (e.g., re-encoding module 135 of FIG. 1 or FIG. 2) and/or a filter module (e.g., filter module 130 of FIG. 1, FIG. 2, or FIG. 4) associated with the mainframe. At block 810, the received at least one mainframe event is converted to an open format. In certain examples, the open format may be the Common Event Format (CEF). Alternatively, other open formats may also be used.

At block 815, a destination SIEM application for the received at least one mainframe event is selected based on a set of rules. In certain examples, the destination SIEM application may be selected from a number of available SIEM applications. The destination SIEM application may be implemented in whole or in part at the mainframe and/or at a computing device in direct or indirect communication with the mainframe. In certain examples, a content and/or type of the at least one mainframe event is determined, and the destination SIEM application is selected based at least on the content or type of the at least one mainframe event. Additionally or alternatively, other rules may be used to select the destination SIEM application, including rules based on time of day, security parameters and profiles, administrator preferences, SIEM application load, and the like.

At block 820, a format associated with the selected destination SIEM application is identified. In certain examples, the format identified for the SIEM application may be the open format. In other examples, the format associated with the selected destination SIEM application may be a proprietary format. Where the format associated with the selected destination SIEM application is a something other than the open format, the at least one mainframe event may be converted at the mainframe event server module from the open format to the identified format associated with the selected SIEM application.

At block 825, the at least one mainframe event is transmitted in the identified format from the mainframe event server to the selected destination SIEM application. In certain examples, this transmission includes writing the at least one mainframe event to a text file associated with the selected destination SIEM application (e.g., in a folder on a server to which the destination SIEM application has access). Additionally or alternatively, the transmission includes writing the at least one mainframe event to a syslog daemon associated with the selected destination SIEM application. In additional or alternatively examples, the transmission may include writing the at least one mainframe event to a relational data store (e.g., a SQL database) associated with the selected destination SIEM application.

Figure 9:
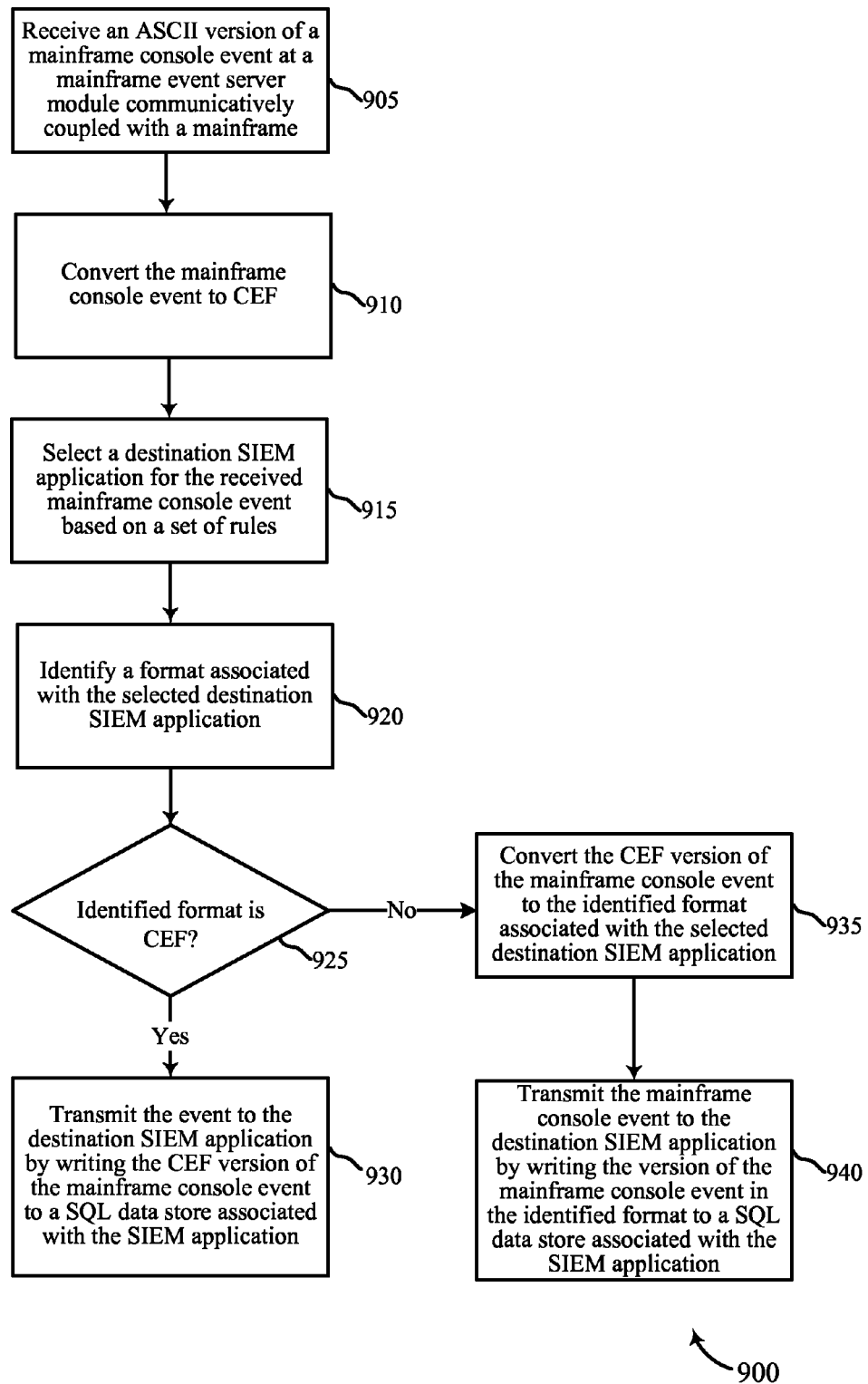
FIG. 9 is a flowchart diagram of an example method of managing mainframe events according to various embodiments of the invention.

Referring next to FIG. 9, a flow chart is shown illustrating another example method 900 for monitoring and managing mainframe events. This method 900 may, for example, be performed in whole or in part by the mainframe event server module 140 of FIG. 1, FIG. 2, FIG. 3, FIGS. 5A-5D, FIG. 6, or FIG. 7. As described above, the mainframe event server module 140 may be implemented in whole or in part by mainframe 105 of FIG. 1, FIG. 2, or FIG. 7, and/or by a separate computing device in communication with the mainframe. The method 900 of FIG. 9 may be an example of the method 800 of FIG. 8.

At block 905, an ASCII version of a mainframe console event is received at a mainframe event server module communicatively coupled with a mainframe. At block 910, the mainframe console event is converted to the open CEF format. At block 915, a destination SIEM application is selected for the received mainframe console event based on a set of rules. At block 920, a format associated with the selected destination SIEM application is identified. At block 925, a decision is made regarding whether the identified format associated with the selected destination SIEM application is the CEF format. If so (block 925, Yes), the event is transmitted to the selected destination SIEM application at block 930 by writing the CEF version of the mainframe console event to a SQL data store associated with the selected SIEM application.

If the identified format is not CEF (block 925, No), the CEF version of the mainframe console event is converted to the identified format associated with the selected destination SIEM application at block 935. Then, at block 940, the mainframe console event is transmitted to the destination SIEM application by writing the version of the mainframe console event in the identified format to a SQL data store associated with the SIEM application.

Figure 10:
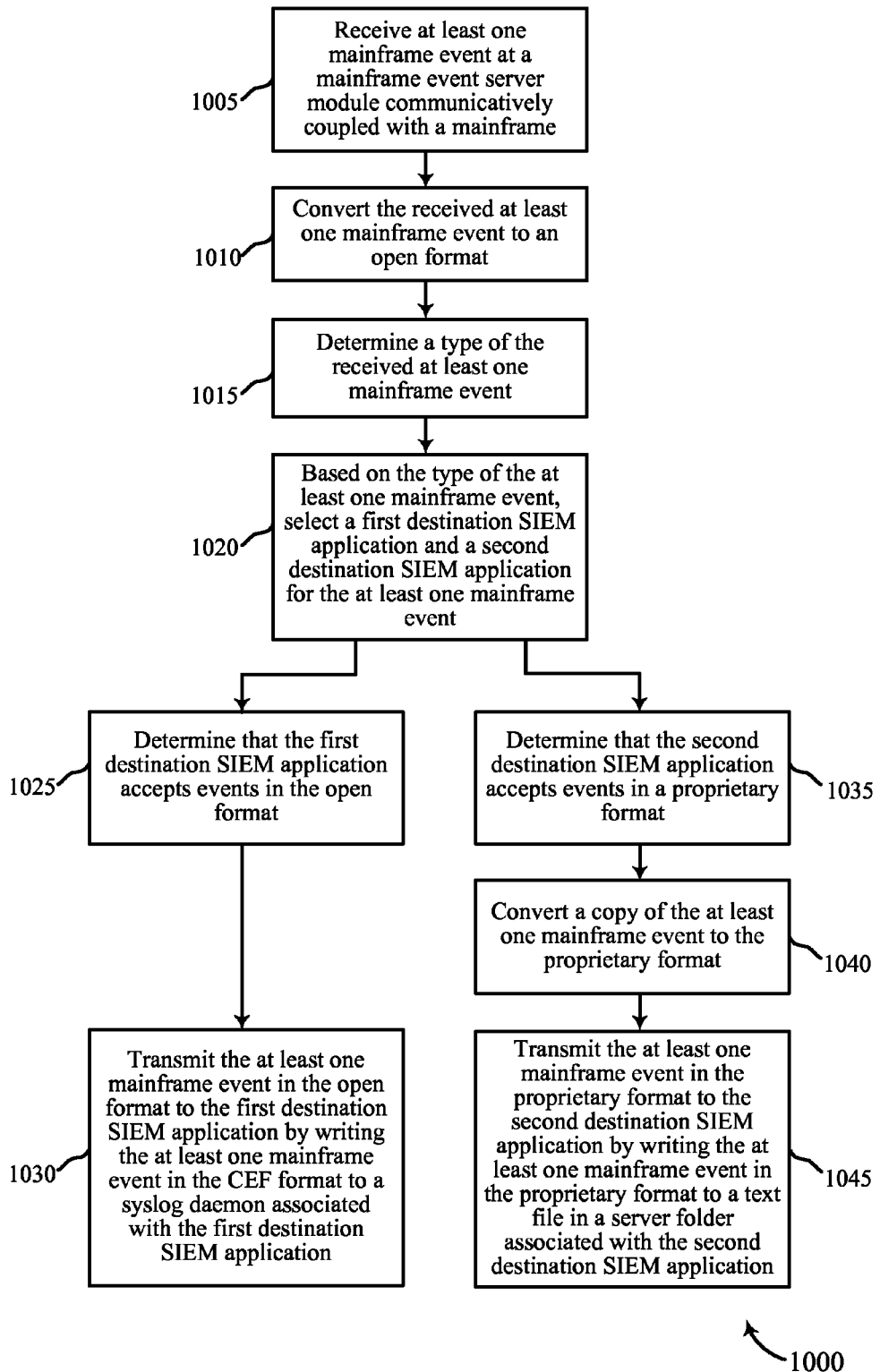
FIG. 10 is a flowchart diagram of an example method of managing mainframe events according to various embodiments of the invention.

Referring next to FIG. 10, a flow chart is shown illustrating another example method 1000 for monitoring and managing mainframe events. This method 1000 may, for example, be performed in whole or in part by the mainframe event server module 140 of FIG. 1, FIG. 2, FIG. 3, FIGS. 5A-5D, FIG. 6, or FIG. 7. As described above, the mainframe event server module 140 may be implemented in whole or in part by mainframe 105 of FIG. 1, FIG. 2, or FIG. 7, and/or by a separate computing device in communication with the mainframe. The method 1000 of FIG. 10 may be an example of the method 800 of FIG. 8 or the method 900 of FIG. 9.

At block 1005, at least one mainframe event is received at a mainframe event server module communicatively coupled with a mainframe. At block 1010, the received at least one mainframe event is converted to an open format. At bock 1015, a type of the received at least one mainframe event is determined. At block 1020, a first destination SIEM application and a second destination SIEM application are selected for the at least one mainframe event based on its type. The method diverges into two branches from block 1020.

In the first branch, it is determined at block 1025 that the first destination SIEM application accepts events in the open format. At block 1030, the at least one mainframe event is transmitted to the first destination SIEM application by writing the at least one mainframe event in the CEF format to a syslog daemon associated with the first destination SIEM application.

In the second branch, it is determined at block 1035 that the second destination SIEM application accepts events in a proprietary format. At block 1040, a copy of the at least one mainframe event is converted to the proprietary format. At block 1045, the at least one mainframe event is transmitted to the second destination STEM application by writing the at least one mainframe event in the proprietary format to a text file in a server folder associated with the second destination SIEM application.

Figure 11:
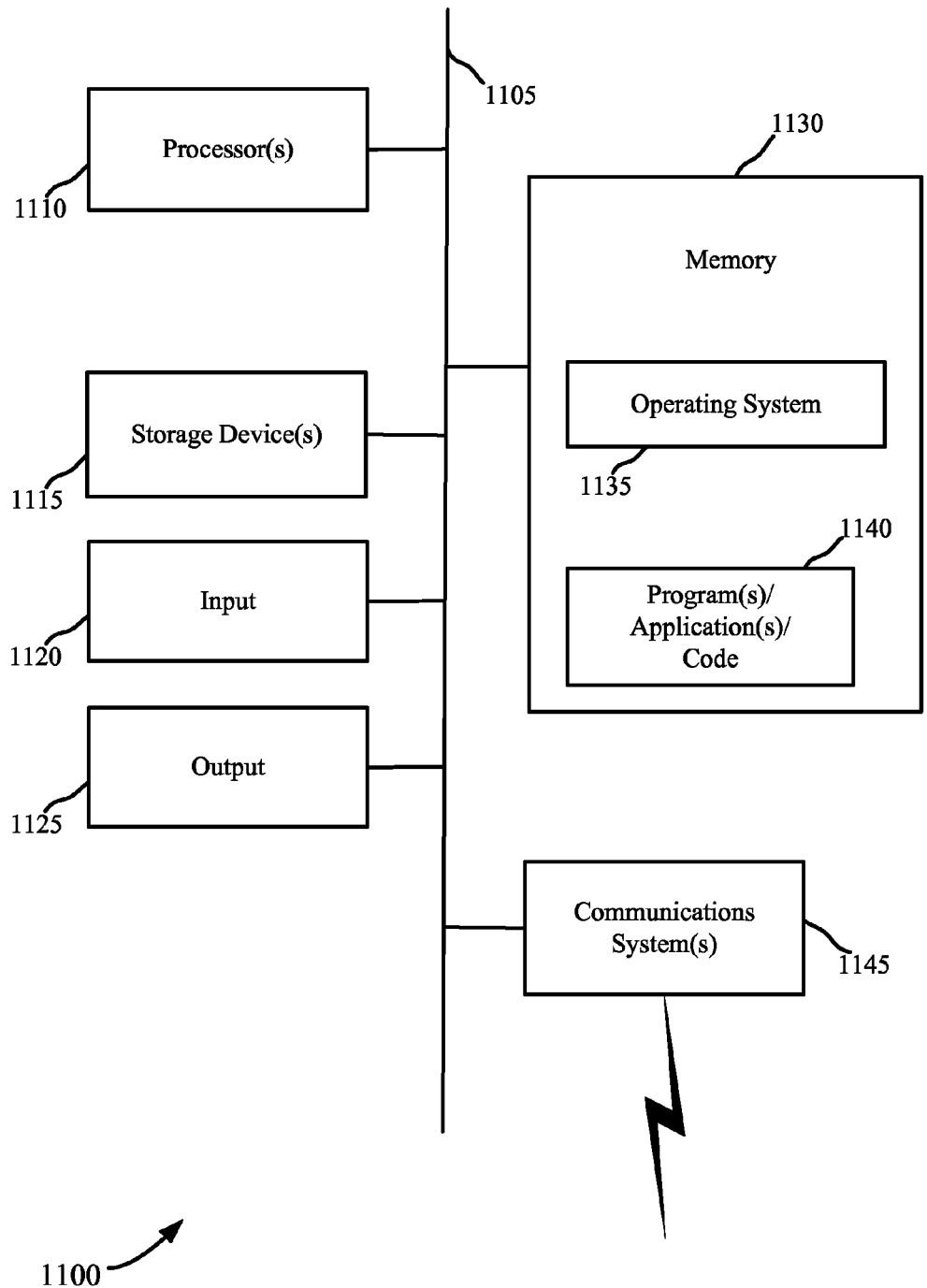
FIG. 11 is a schematic diagram that illustrates a representative payment authority server system that may be used in various embodiments of the present invention.

A device structure 1100 that may be used for a mainframe 105 of FIG. 1 or 2; for the mainframe event server module 140 of FIG. 1, FIG. 2, FIG. 3, FIGS. 5A-5D, FIG. 6, or FIG. 7; for a computer device or SIEM appliance 715 implementing one or more of the destination SIEM applications 235 of FIG. 2, FIGS. 5A-5D, or FIG. 7; or for other computing devices or modules described herein, is illustrated with the schematic diagram of FIG. 11. This drawing broadly illustrates how individual system elements of each of the aforementioned devices may be implemented, whether in a separated or more integrated manner. The exemplary structure is shown comprised of hardware elements that are electrically coupled via bus 1105, including processor(s) 1110 (which may further comprise a DSP or special-purpose processor), storage device(s) 1115, input device(s) 1120, and output device(s) 1125. The storage device(s) 1115 may be a machine-readable storage media reader connected to any machine-readable storage medium, the combination comprehensively representing remote, local, fixed, or removable storage devices or storage media for temporarily or more permanently containing computer-readable information. The communications systems 1145 may interface to a wired, wireless, or other type of interfacing connection that permits data to be exchanged with other devices. The communications system(s) 1145 may permit data to be exchanged with a network.

The structure 1100 may also include additional software elements, shown as being currently located within working memory 1130, including an operating system 1135 and other code 1140, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for managing mainframe events, comprising:
receiving at least one mainframe event at a mainframe event server module communicatively coupled with a mainframe, wherein the received mainframe events comprise mainframe events detected from at least one system management facility (SMF) log file associated with the mainframe and filtered according to at least one predetermined filtering criterion;
converting the received at least one mainframe event to an open format;
selecting a destination Security Information and Event Management (SIEM) application for the received at least one mainframe event based on a set of rules;
identifying a format associated with the selected destination SIEM application; and
transmitting the at least one mainframe event in the identified format from the mainframe event server module to the selected destination SIEM application.

2. The method of claim 1, further comprising:
converting the received at least one mainframe event from the open format to the identified format associated with the selected destination SIEM application.

3. The method of claim 1, further comprising:
determining a content of the at least one mainframe event;
wherein the selecting the destination SIEM application is based at least partly on the content of the at least one mainframe event.

4. The method of claim 1, further comprising:
determining a type of the at least one mainframe event;
wherein the selecting the destination SIEM application is based at least partly on the type of the at least one mainframe event.

5. The method of claim 1, wherein the transmitting the at least one mainframe event to the selected destination SIEM application comprises:
writing the at least one mainframe event to a text file associated with the selected destination SIEM application.

6. The method of claim 1, wherein the transmitting the at least one mainframe event to the selected destination SIEM application comprises:
writing the at least one mainframe event to a syslog daemon associated with the selected destination SIEM application.

7. The method of claim 1, wherein the transmitting the at least one mainframe event to the selected destination SIEM application comprises:
writing the at least one mainframe event to a relational data store associated with the selected destination SIEM application.

8. The method of claim 1, wherein the mainframe events received at the mainframe event server module comprise mainframe events detected from a management console of the mainframe.

9. The method of claim 1, wherein the open format comprises Common Event Format (CEF).

10. A mainframe event server system, comprising:
a reformatting module configured to receive at least one mainframe event associated with a mainframe and convert the received at least one mainframe event to an open format, wherein the received mainframe events comprise mainframe events detected from at least one system management facility (SMF) log file associated with the mainframe and filtered according to at least one predetermined filtering criterion;
a destination selection module configured to select a destination Security Information and Event Management (SIEM) application for the received at least one mainframe event based on a set of rules and identify a format associated with the selected destination SIEM application; and
a routing module configured to transmit the at least one mainframe event in the identified format from the mainframe event server module to the selected destination SIEM application.

11. The system of claim 10, wherein the reformatting module is further configured to:
convert the received at least one mainframe event from the open format to the identified format associated with the selected destination SIEM application.

12. The system of claim 10, wherein the destination selection module is further configured to:
determine a content of the at least one mainframe event;
wherein the selecting the destination SIEM application is based at least partly on the content of the at least one mainframe event.

13. The system of claim 10, wherein the destination selection module is further configured to:
determine a type of the at least one mainframe event;
wherein the selecting the destination SIEM application is based at least partly on the type of the at least one mainframe event.

14. The system of claim 10, wherein the routing module is further configured to:
write the at least one mainframe event to a text file associated with the selected destination SIEM application.

15. The system of claim 10, wherein the routing module is further configured to:
write the at least one mainframe event to a syslog daemon associated with the selected destination SIEM application.

16. The system of claim 10, wherein the routing module is further configured to:
write the at least one mainframe event to a relational data store associated with the selected destination SIEM application.

17. A mainframe event server system, the system comprising:
at least one processor;
at least one memory communicatively coupled with the at least one processor, the at least one memory comprising executable code that, when executed by the at least one processor, causes the at least one processor to:
receive at least one mainframe event associated with a mainframe, wherein the received mainframe events comprise mainframe events detected from at least one system management facility (SMF) log file associated with the mainframe and filtered according to at least one predetermined filtering criterion;
convert the received at least one mainframe event to an open format;
select a destination Security Information and Event Management (SIEM) application for the received at least one mainframe event based on a set of rules;
identify a format associated with the selected destination SIEM application; and transmit the at least one mainframe event in the identified format from the mainframe event server module to the selected destination SIEM application.

18. The system of claim 17, wherein the executable code further causes the at least one processor to:
convert the received at least one mainframe event from the open format to the identified format associated with the selected destination SIEM application.

19. The system of claim 17, wherein the executable code further causes the at least one processor to:
determine a content of the at least one mainframe event;
wherein the selecting the destination SIEM application is based at least partly on the content of the at least one mainframe event.

* * * * *